(12) United States Patent
Priyanto et al.

(10) Patent No.: US 10,742,375 B2
(45) Date of Patent: Aug. 11, 2020

(54) TIMING RELATIONSHIPS OF PILOT AND DATA FOR MOBILE NETWORK COMMUNICATIONS

(71) Applicant: SONY MOBILE COMMUNICATIONS INC., Tokyo (JP)

(72) Inventors: Basuki Priyanto, Lund (SE); Rickard Ljung, Helsingborg (SE); Peter C. Karlsson, Lund (SE); Erik Bengtsson, Eslöv (SE)

(73) Assignee: SONY CORPORATION, Tokyo (JP)

( * ) Notice: Subject to any disclaimer, the term of this patent is extended or adjusted under 35 U.S.C. 154(b) by 30 days.

(21) Appl. No.: 16/095,529

(22) PCT Filed: May 13, 2016

(86) PCT No.: PCT/US2016/032278
§ 371 (c)(1),
(2) Date: Oct. 22, 2018

(87) PCT Pub. No.: WO2017/196359
PCT Pub. Date: Nov. 16, 2017

(65) Prior Publication Data
US 2019/0132101 A1   May 2, 2019

(51) Int. Cl.
*H04L 5/00* (2006.01)
*H04L 25/02* (2006.01)

(52) U.S. Cl.
CPC .......... *H04L 5/0048* (2013.01); *H04L 5/0044* (2013.01); *H04L 5/0053* (2013.01);
(Continued)

(58) Field of Classification Search
None
See application file for complete search history.

(56) References Cited

U.S. PATENT DOCUMENTS 8,081,693 B2 * 12/2011 Li ................. H04L 27/2607
  375/260
10,306,671 B2 * 5/2019 Li ................. H04W 52/0216
(Continued)

FOREIGN PATENT DOCUMENTS

| WO | 2008127165 A1 | 10/2008 |
| WO | 2011050856 A1 | 5/2011 |
| WO | 2015148045 A1 | 10/2015 |

OTHER PUBLICATIONS

International Search Report and Written Opinion from corresponding International Application No. PCT/US2016/032278, dated Feb. 1, 2017; 11 pages.

*Primary Examiner* — Bunjob Jaroenchonwanit
(74) *Attorney, Agent, or Firm* — Tucker Ellis LLP

(57) ABSTRACT

The invention is directed to systems, methods, and computer program products for determining timing relationships of pilot and data in mobile network communications. Specifically, an uplink (UL) transmission is received at a base station (BS) from a user equipment (UE) in network communication with the BS via a communication channel. Based on the UL transmission, a channel coherence time is determined indicating a period of time during which the communication channel is considered to be substantially unchanged. In response, a total transmission duration is determined based on the channel coherence time indicating a period of time associated with transmission of a data frame.

19 Claims, 8 Drawing Sheets

(52) U.S. Cl.
CPC .......... H04L 5/0055 (2013.01); H04L 5/0085 (2013.01); H04L 25/0222 (2013.01); *H04L 5/0078* (2013.01)

(56) References Cited

U.S. PATENT DOCUMENTS

| | | | | |
|---|---|---|---|---|
| 2003/0086393 A1* | 5/2003 | Vasudevan | ............ | H04L 1/0006 370/330 |
| 2003/0142696 A1* | 7/2003 | Holmeide | ............. | H04L 12/427 370/508 |
| 2004/0228267 A1* | 11/2004 | Agrawal | ................ | H04B 1/713 370/203 |
| 2005/0003847 A1* | 1/2005 | Love | ................... | H04W 52/221 455/522 |
| 2005/0088960 A1* | 4/2005 | Suh | ......................... | H04L 5/026 370/208 |
| 2005/0094552 A1* | 5/2005 | Abe | ...................... | H04L 5/0046 370/208 |
| 2005/0226141 A1* | 10/2005 | Ro | ........................... | H04B 1/69 370/203 |
| 2010/0238902 A1* | 9/2010 | Ji | ........................ | H04B 1/7143 370/331 |
| 2011/0310837 A1* | 12/2011 | Classon | ................ | H04L 1/1822 370/329 |
| 2012/0106390 A1* | 5/2012 | Guo | .................. | H04W 72/1231 370/252 |
| 2012/0128084 A1* | 5/2012 | Aguirre | ............... | H04W 72/048 375/260 |
| 2014/0133435 A1 | 5/2014 | Forensa | | |
| 2015/0318970 A1* | 11/2015 | Fouad | .................. | H04L 5/0053 370/252 |
| 2015/0373660 A1* | 12/2015 | Gunnarsson | ...... | H04W 56/0045 370/350 |
| 2017/0180103 A1* | 6/2017 | Min | .......................... | H04L 5/14 |
| 2017/0264399 A1* | 9/2017 | Li | .......................... | H04L 1/1812 |
| 2018/0020035 A1* | 1/2018 | Boggia | ................ | H04L 65/4084 |
| 2018/0242317 A1* | 8/2018 | Marinier | ............. | H04W 72/042 |
| 2019/0289594 A1* | 9/2019 | Papasakellariou | .... | H04L 1/0026 |
| 2019/0306825 A1* | 10/2019 | Lindskog | ............. | H04W 24/08 |

* cited by examiner

TIMING RELATIONSHIPS OF PILOT AND DATA FOR MOBILE NETWORK COMMUNICATIONS

FIELD OF THE INVENTION

In general, embodiments of the invention relate to mobile network communications and, more particularly, systems and methods for determining timing relationships of pilot and data for mobile network communications, e.g., massive multiple input multiple output MIMO network communications or the like.

BACKGROUND

New Radio (NR) access technique is currently discussed in 3GPP ($3^{rd}$ Generation Partnership Project). The NR concept includes new waveform, new multiple access schemes, symbol and subcarrier numerologies, and new frame structures. Compared to legacy communication systems such as Wideband Code Division Multiple Access (WCDMA) and Long Term Evolution (LTE), NR is targeted to include many unique characteristics such as flexible and scalable operations and smaller sub-frame/frame duration (e.g., in the order of 100-200 microseconds (µs)) to support low latency communications.

Multiple-input and multiple-output (MIMO) is the use of multiple antennas at both a transmitter (e.g., a base station "BS" and/or user equipment "UE", otherwise referred to as a mobile device) and a receiver (e.g., a BS and/or UE) in order to improve link and or system capacity between the transmitter and the receivers. Massive MIMO, otherwise referred to as a MaMi network, refers to using a large number of antennas (e.g., equal to or greater than a threshold number) at the transmitter, receiver or both. For example a base station may have hundreds of antennas, arranged in an antenna array, while the user equipment will have at least one and, optionally, two to four antennas.

Typically, for TDD system the information stream between a base station (BS) and a user equipment (UE) is operated with a time division duplex and is split into timeslots or sections embedded in a frame structure, commonly referred to as a radio frame. Different timeslots for uplink (UL) data communications and downlink (DL) data communications are provided for communicating information from the UE to the BS (uplink) and for communicating information from the BS to the UE (downlink). Also other duplex methods can be considered, where uplink and downlink communication besides time can be separated by other means, e.g. frequency and/or coding. As part of the radio frame, the information communicated between the UE and the BS includes, in addition to payload information, pilot signals that are used in the estimation of the communication channel. Due to limited coherence time in some systems the validity of this pilot signal is limited. Therefore the pilot signal can be positioned in the beginning of the radio frame, to enable usage of the pilot information during following parts of the same radio frame. In order to calibrate the antennas in a MaMi network and focus energy to the UEs from the antennas, thereby maximizing antenna gain, the UEs transmit a pilot signal, in a dedicated time slot within a radio frame, which is listened for by all the antennas at the BS. The validity of the pilot signal that is transmitted from the UE is very time limited (i.e., time coherency is minimal). If the UE is physically moved a short distance the pilot signal will no longer be valid and the channel will appear different. Therefore, the pilot signal needs to be transmitted on the uplink frequently (e.g., once every millisecond (ms) or the like).

FIG. 1 illustrates a frame structure to support low latency (i.e., minimal delay), in accordance with the prior art. In NR, a frame structure that supports the low latency DL traffic requires DL resources followed by the UL resources such that the UL resources contain acknowledgement (ACK)/negative-acknowledgement (NACK) information, which is sent immediately after the DL transmission, as shown in FIG. 1.

FIG. 2 illustrates a frame structure to support massive MIMO, in accordance with the prior art. In MaMi network, the UL transmission is allocated first and followed by the DL transmission. This is done to enable the BS in the MaMi network to process the UL pilot and determine antenna configuration parameters, as shown in FIG. 2. Based on the received pilot signal, a BS may configure the transceivers of its antenna array according to spatial and environmental conditions for subsequent transmission of payload information. The UL pilots for each UE in a MaMi network are orthogonal to each other and serve as reference for both the BS antenna array configuration and calibration of the constellation diagram. In this regard, each individual UE is allocated to a unique time/frequency resource for the pilot transmission. Typically, the UL pilot is used to calibrate the constellation diagram for the BS to be able to decode the UL payload. While the calibration of the constellation diagram is ideally not required at the UE side, it is unavoidable due to channel erosion, reciprocity errors, interference, or the like. For the DL, the UL pilot is again used to determine pre-coding for the DL payload. This DL payload does not need to be on an orthogonal time/frequency resource as it is pre-coded for spatial diversity.

For asymmetric traffic typically dominated by DL transmission, a UL pilot is scheduled with a repetition rate corresponding to at least the coherence time to update the BS with the channel response. Since the BS requires a specific amount of time to determine a precoding matrix, the UL pilot signals may be interleaved. In this regard, the BS uses the received UL pilot signal from a first frame to determine antenna configuration parameter for transmission of payload in the second frame (a frame that follows the first frame directly). At higher frequencies fixed beams may be used for the DL to transmit frames with a DL pilot for the UE to configure its antennas. The UL pilots are used for calibration of constellation points and also beam steering or beam selection at the BS. In this regard, the UL pilots may be spatially integrated with the UL payload.

In a two-way communication system over wireless channels, both DL and UL pilots are typically repeatedly required to be transmitted between the BS and UE to estimate channel properties, such as link adaptations, synchronization, power control, or the like.

To realize the capabilities of 5G ($5^{th}$ Generation) wireless access, such as low latency communication, very high data rates, ultrahigh reliability, energy efficiency, and extreme device densities, the present invention proposes methods of adopting the frame structure of massive MIMO technology in the 5G NR technology. The techniques proposed herein can also be applied to wireless LAN standardization that they require the operation of massive number of antennas (e.g., 802.11ay) operating in time division duplexing (TDD) mode.

SUMMARY OF THE INVENTION

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for determining timing relationships of pilot and data, wherein the system is configured to: receive, at a Base Station (BS), an uplink (UL) pilot as part of a UL transmission from a User Equipment (UE) in network communication with the BS via a communication channel; determine a channel coherence time, wherein the channel coherence time comprises a period of time during which the communication channel is considered to be substantially unchanged; and determine a total transmission duration based on at least the channel coherence time.

In some embodiments, the channel coherence time is determined based on at least the UL transmission.

In some embodiments, the total transmission duration comprises a period of time associated with transmission of a data frame, wherein the period of time associated with the transmission of the data frame comprises a preconfigured upper limit value.

In some embodiments, determining the total transmission duration further comprises determining a link quality performance of the communication channel.

In some embodiments, the UL pilot is transmitted by the UE at a first frame associated with the data frame and/or a subsequent UL payload information in a second frame associated with the data frame, wherein the second frame immediately follows the first frame.

In some embodiments, prior to determining the channel coherence time, the module is further configured to: determine Downlink Control Information (DCI) based on at least the UL transmission, wherein the DCI comprises information required to decode data transmission between the BS and the UE; transmit the DCI to the UE; and initiate downlink (DL) transmission from the BS to the UE, wherein the downlink transmission is decoded by the UE based on the DCI, wherein the DL transmission comprises a DL pilot and/or a DL payload.

In some embodiments, determining DCI further comprises determining an offset time (T_of), wherein the T_of comprises a period of time between the a time stamp associated with the receiving of the UL transmission and a time stamp associated with a DL transmission.

In some embodiments, determining DCI further comprises determining antenna configuration parameter associated with one or more antenna in the BS, wherein the antenna configuration parameter is determined during the T_of.

In some embodiments, determining T_of further comprises determining a minimum duration associated with the T_of and a maximum duration associated with the T_of, wherein the minimum duration comprises a time period for processing the UL transmission to determine antenna configuration parameters, wherein the maximum duration comprises a time period equivalent to the coherence time.

In some embodiments, determining T_of further comprises determining a maximum duration associated with the T_of, wherein the maximum duration comprises a time period associated with a difference between a channel coherence time and a sum of a time period associated with the UL transmission and a time period associated with the DL transmission In some embodiments, the T_of is determined by the BS based on at least one or more channel characteristics, wherein the one or more channel characteristics comprises UE mobility and/or link quality performance of the communication channel.

In some embodiments, the UE mobility is determined based on at least the UL transmission and/or the DL transmission.

In some embodiments, the UE mobility is determined at the BS and/or at the UE.

In some embodiments, the T_of is determined by the BS based on at least one or more channel characteristics, wherein the one or more channel characteristics comprises operating frequency.

In some embodiments, wherein the total transmission duration is determined by defining a period of time between a time stamp indicating a beginning of the UL transmission and a time stamp indicating a completion of the DL transmission.

In some embodiments, wherein the total transmission duration is determined based on at least the UL pilot.

In some embodiments, the UL transmission and/or DL transmission comprises ACK (acknowledgement)/NACK (negative-acknowledgement) indicating a positive or negative reception of data transmission between the BS and the UE.

In some embodiments, the DCI further comprises UL pilot allocation (e.g., T_of), DL data allocation, and/or UL ACK/NACK allocation (e.g., T_ACK).

In another aspect, a method for determining timing relationships of pilot and data is presented. The method comprising: receiving, at a Base Station (BS), an uplink (UL) pilot as part of a UL transmission from a User Equipment (UE) in network communication with the BS via a communication channel; determining, using a computing device processor, a channel coherence time, wherein the channel coherence time comprises a period of time during which the communication channel is considered to be substantially unchanged; and determining, using a computing device processor, a total transmission duration based on at least the channel coherence time.

In yet another aspect, a computer program product for determining timing relationships of pilot and data is provided. The computer program product comprising a non-transitory computer-readable medium comprising code causing a first apparatus to: receive, at a Base Station (BS), an uplink (UL) pilot as part of a UL transmission from a User Equipment (UE) in network communication with the BS via a communication channel; determine a channel coherence time, wherein the channel coherence time comprises a period of time during which the communication channel is considered to be substantially unchanged; and determine a total transmission duration based on at least the channel coherence time.

BRIEF DESCRIPTION OF THE DRAWINGS

Figure 1:
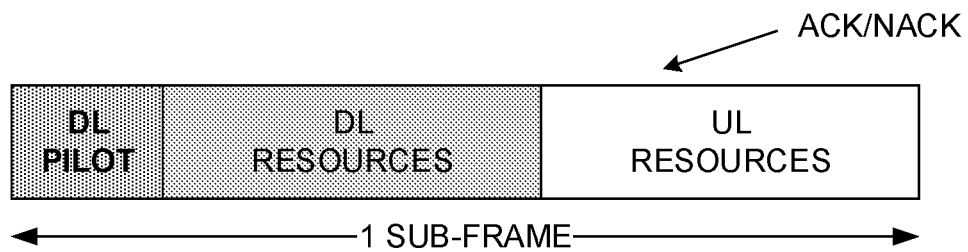
Figure 2:
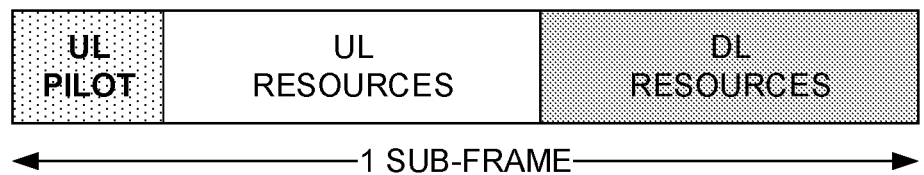
Figure 3:
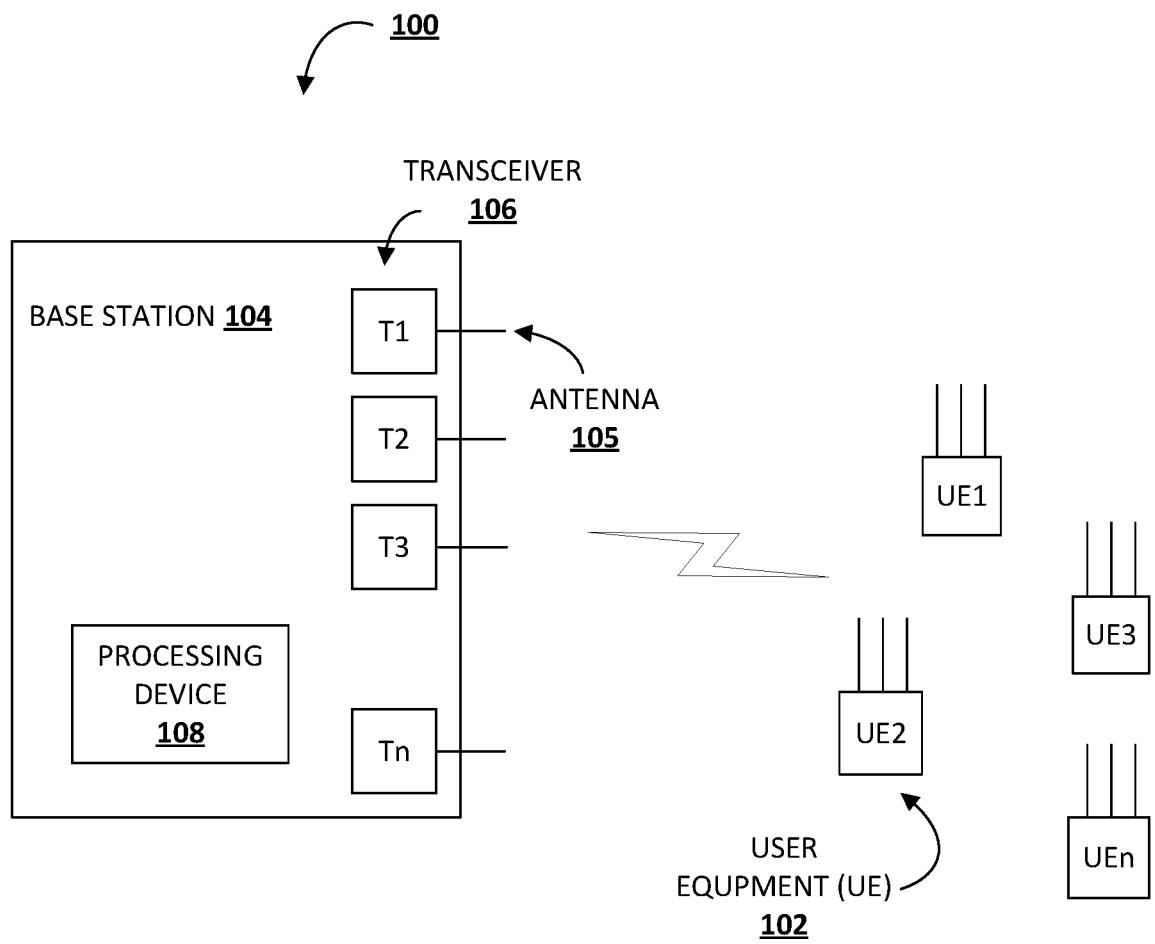
Figure 4:
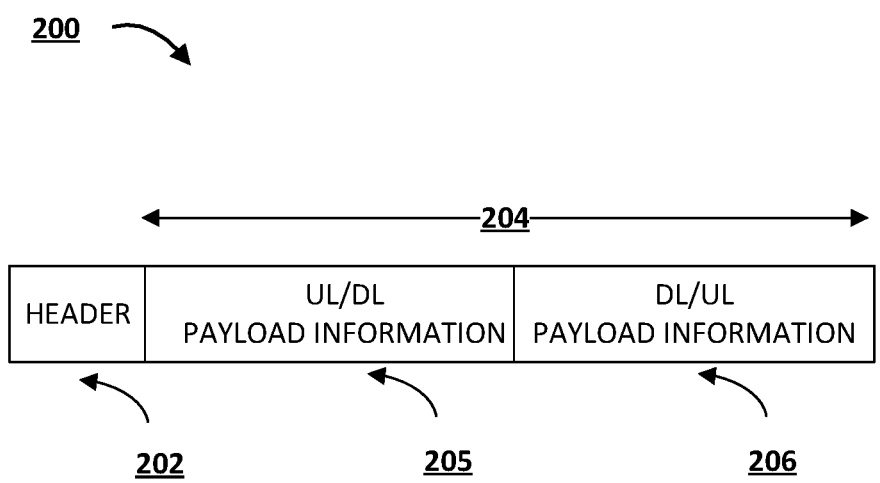
Figure 5:
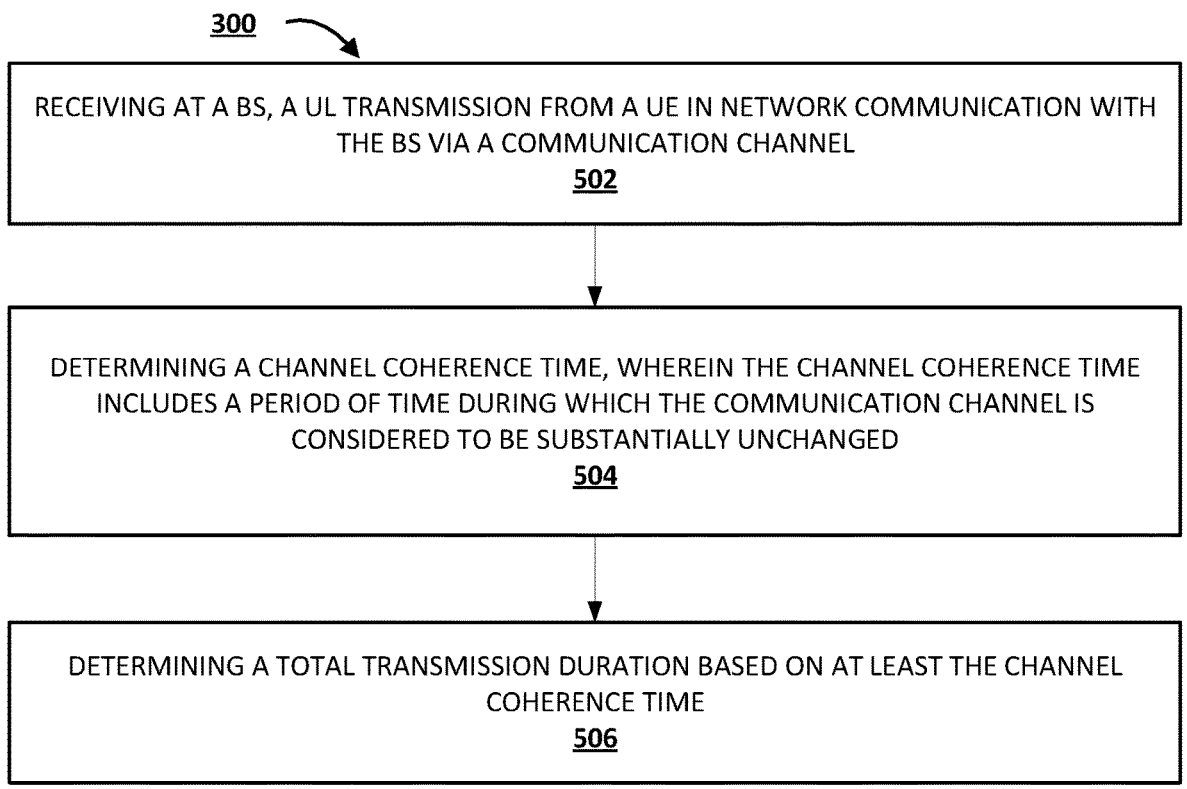
Figure 6:
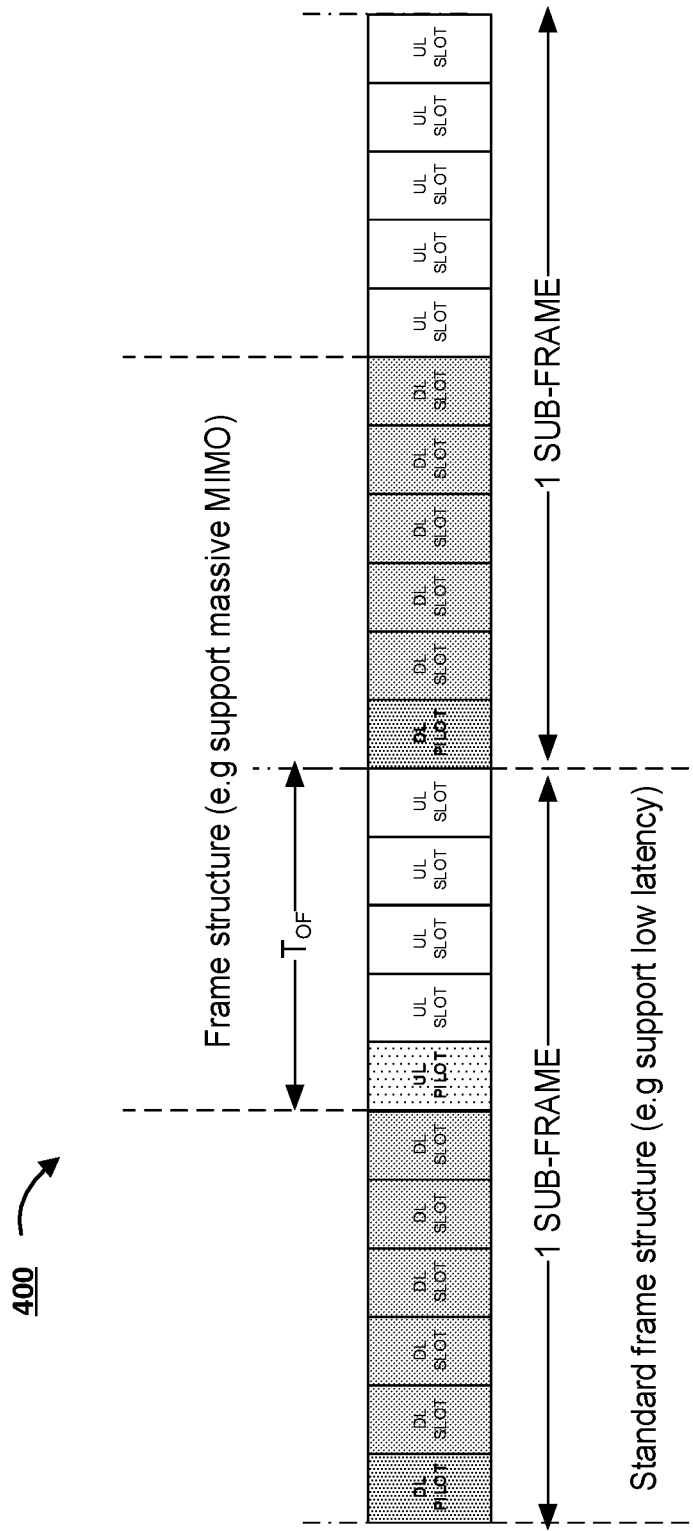
Figure 7:
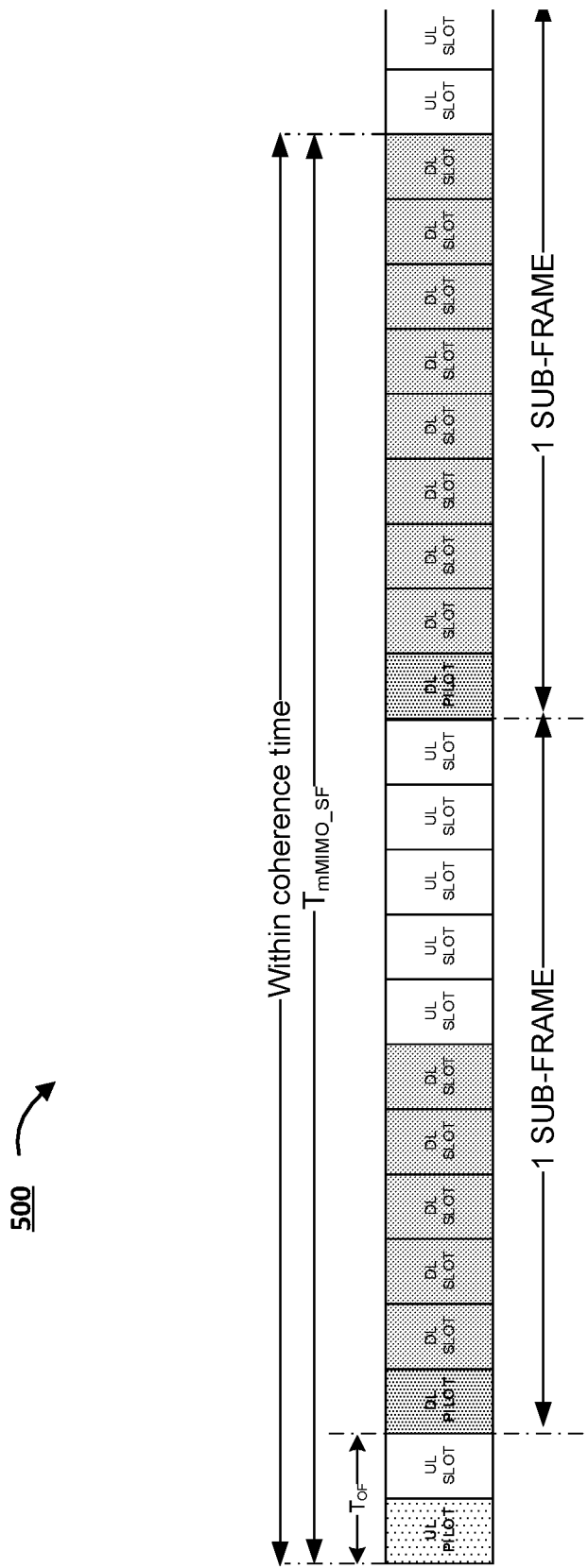
Figure 8:
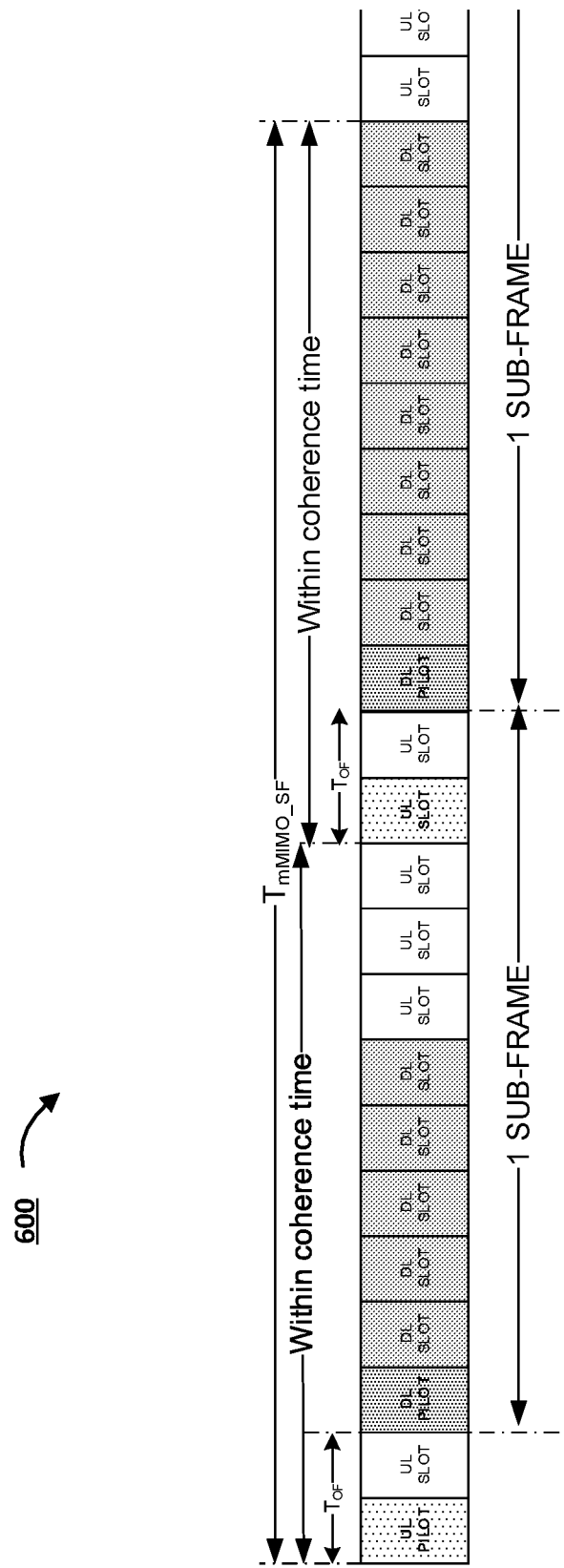
Figure 9:
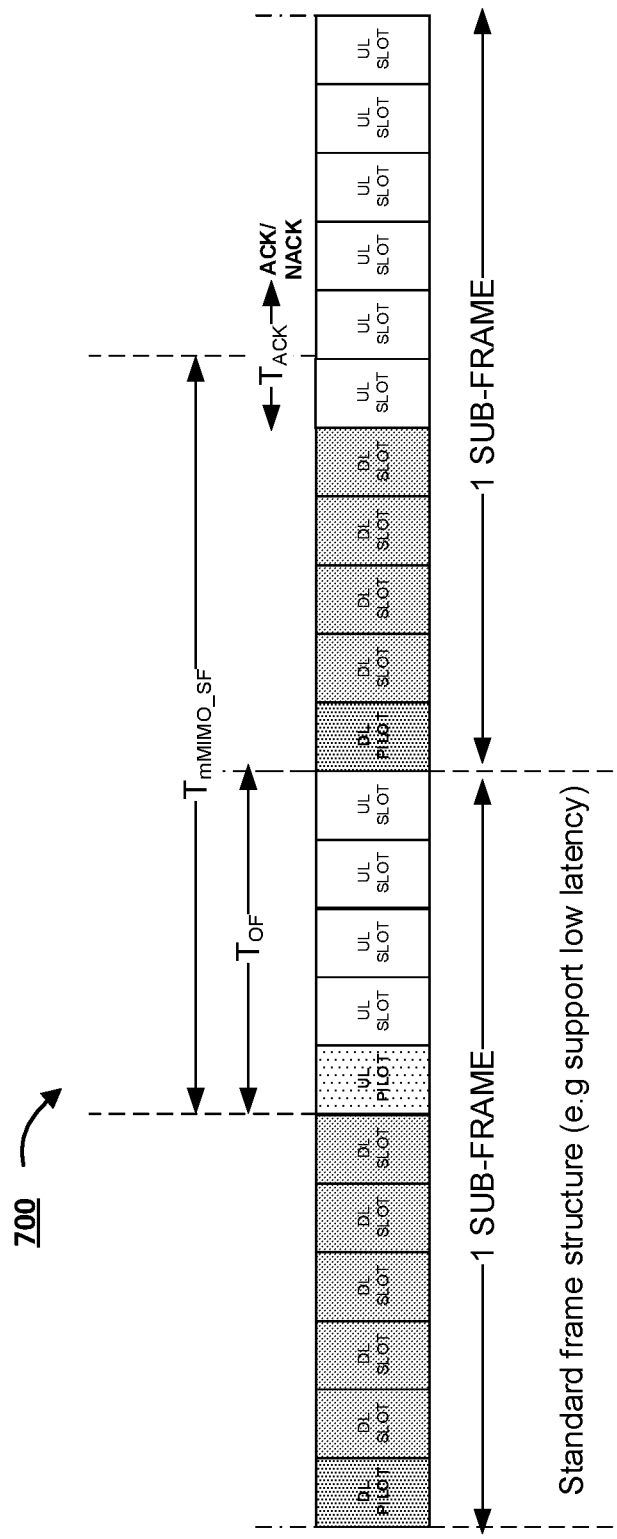

Having thus described embodiments of the invention in general terms, reference will now be made to the accompanying drawings, wherein:

FIG. 1 illustrates a frame structure to support low latency, in accordance with the prior art;

FIG. 2 illustrates a frame structure to support massive MIMO, in accordance with the prior art;

FIG. 3 illustrates a base station (BS) and user equipment (UE) in a communication environment, in accordance with an embodiment of the invention;

FIG. 4 illustrates a typical structure of a frame that may be transmitted between each user equipment and the BS, in accordance with an embodiment of the invention FIG. 5 illustrates a flow diagram of a method for determining timing relationships of pilot and data, in accordance with an embodiment of the invention;

FIG. 6 illustrates a combination of (sub) frame structures in a transmission, in accordance with an embodiment of the invention;

FIG. 7 illustrates a massive MIMO (sub) frame structure with reference of the last slot in a (sub) frame, in accordance with an embodiment of the invention;

FIG. 8 illustrates a long massive MIMO frame structure with one or more UL pilots, in accordance with an embodiment of the invention; and FIG. 9 illustrates a massive MIMO (sub) frame structure with low latency support, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. For clarity, non-essential elements may have been omitted from some of the drawing.

It will be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

As used herein, a "base station" may relate to any type of a cellular or non-cellular access node of a wireless radio network, so that the term "base station" for example may refer to a base station of a cellular/mobile communication network or to an access point of a wireless local area network (WLAN) for the transmission of information with corresponding user equipment. The bases station may comprise a massive antenna array, or the base station or base station side may have distributed antennas, so that the invention may also be applied to so-called cooperative multiple input multiple output (MIMO) systems or distributed antenna systems.

As used herein, "user equipment" may refer to any device including but not limited to mobile phones or other mobile computing devices, mobile televisions, laptop computers, smart screens, tablet computers or tablets, portable desktop computers, e-readers, scanners, portable media devices, gaming devices, cameras or other image-capturing devices, headgear, eyewear, watches, bands (e.g., wristbands) or other wearable devices, or other portable computing or non-computing devices. For purposes of the invention, a device may also be referred to as a UE, a system, or apparatus. The invention is not limited to any particular types of devices/UEs.

As used herein, "transmit" or "transmission" may refer to both receiving information from the user equipment (UE) at the base station (BS) and sending information from the BS to the UE.

As used herein, "antenna configuration parameter" may cover both an analog configuration and a digital configuration of the respective antenna. In an embodiment of the invention, all antenna configuration is made in the digital domain, so that the antennas may be passive components that are fed with signals having an amplitude and/or a phase determined from the training signals and the correspondingly calculated footprint matrix.

FIG. 3 illustrates a BS and a UE in a communication environment 100, in accordance with an embodiment of the invention. As shown in FIG. 3, the communication environment 100 includes UE 102 (indicated by UE1 ... UEn) and a BS 104. The BS 104 includes a plurality of antennas 105 and associated transceivers 106 (indicated by T1 ... Tn). In some embodiments, the BS 104 includes a plurality of distributed antennas. Similarly, each UE 102 may comprise one or more antennas, as shown in FIG. 1. The BS 104 further includes a processing unit 108 coupled to the transceivers 106 and adapted to configure the transceivers 106 to transmit radio frequency signals between the BS 104 and the UE 102. The multiple antennas 105 and transceivers 106 of the BS 104 may be configured such that the above-described MIMO technology may be utilized for transmissions between the BS 104 and the UE 102. The signal processing according to the MIMO technology may be performed in analog or digital domain or a combination thereof. Therefore, for example, a part of the transceiver functionality may be implemented digitally, for example in a signal processor or in the processing unit 108, and the antennas 105 and the remaining parts of the transceivers 106 may be active or passive analog components.

In some embodiments, each UE 102 transmits a radio frequency training signal or a pilot signal with a training sequence to the BS 104 to determine antenna configuration parameters for each of the transceivers 106 of the BS 104 to provide a high-quality transmission by taking into account spatial information of individual UE 102. The pilot signal is received and processed at each antenna or a subset of the plurality of antennas 105. Based on the received training signal or a pilot signal the corresponding antenna configuration parameters for the transceivers 106 may be determined at the BS 104. Examples of antenna configuration parameters include but are not limited to, precoding matrix, multiple beams, Hermetian transpose, matched filter, or the like.

FIG. 4 illustrates a typical structure of a frame 200 that may be transmitted between each user equipment 102 and the BS 104, in accordance with an embodiment of the invention. The frame 200 in general comprises a header 202, and a payload information section 204. The header 202 typically comprises a plurality of slots, e.g., in terms of time and frequency resource allocation for receiving pilot signals and time and frequency resources from UE 102 and/or BS 104. The payload information section 204 includes an uplink (UL) payload information session 205 and/or a downlink (DL) payload information section 206. In some embodiments, the pilot signals received in a frame 200 may normally be used at the BS 104 to calculate a Hermetian transpose of the channel matrix to determine the antenna configuration parameters for the one or more antennas 106 concerned for the subsequent transmission of payload information.

FIG. 5 illustrates a flow diagram of a method 300 for determining timing relationships of pilot and data, in accordance with an embodiment of the invention. As shown in block 502, the flow diagram includes receiving at a BS, a UL transmission from a UE in network communication with the BS via a communication channel. In some embodiments, the UL transmission further comprises a UL pilot signal and/or a UL payload information. In one aspect, the UL pilot signal is transmitted by the UE at a first frame associated with the data frame. In another aspect, the UL payload information is transmitted by the UE in a second frame of the data frame, the second frame following the first frame.

Next, as shown in block 504, the flow diagram includes determining a channel coherence time, wherein the channel coherence time includes a period of time during which the communication channel is considered to be substantially unchanged. In some embodiments, the channel coherence time is determined based on at least the UL transmission, and more typically, the UL pilot signal. In this regard, once the UL pilot is received at the BS, the BS may be configured to determine a Doppler spread to measure the spectral broadening caused by the time rate of change of the channel. In other words, the Doppler spread may be defined as the range of frequencies over which the received Doppler spectrum is essentially non-zero. In some embodiments, the coherence time may be limited based on at least one or more environmental effects that affect link quality performance associated with the communication channel. In one aspect, prior to determining the channel coherence time, the system may be configured to determine downlink control information (DCI) based on at least the UL transmission. The DCI typically includes information required to decode data transmission between the BS and the UE. In response to determining the DCI, the system then transmits a preconfigured DCI to the UE. In one aspect, the DCI may be transmitted to the UE as part of the header 202. Once the preconfigured DCI is transmitted to the UE, the BS may receive the UL pilot from the UE, calculate the coherence time, and then be configured to initiate DL transmission from the BS to the UE based on at least the DCI. In one aspect, the DL transmission includes a DL pilot and/or a DL payload.

In some embodiments, the system may be configured to determine an offset time (T_of) which indicates a period of time between a time stamp associated with receiving the UL transmission and a time stamp associated with a DL transmission. In other words, T_of indicates a period of time between the transmission of the UL pilot signal and the transmission of the DL pilot signal. As described herein, T_of may be used in the determination of antenna configuration parameters for one or more antennas associated with the BS. In some embodiments, T_of may include a minimum duration and a maximum duration. In one aspect, the minimum duration comprises a time period for processing the UL transmission to determine antenna configuration parameters. In another aspect, the maximum duration comprises a time period equivalent to the channel coherence time. In some embodiments, the BS may be configured to be flexible enough to determine the T_of between a minimum duration and maximum duration based on at least the duration of the UL/DL transmissions.

In some embodiments, the T_of may be determined by the BS based on at least one or more channel characteristics. Examples of channel characteristics include, but are not limited to, UE mobility, radio channel fading, operating frequency, and/or the like. In this regard, the system may be configured to determine T_of based on each channel characteristic and/or a subset of the one or more channel characteristics. For example, the T_of may be configured to a group of frequency bands, for example, group 1 for carrier frequency less than 6 GHz, group 2 for carrier frequency greater than 6 GHz. The UE mobility may be estimated by utilizing either the UL transmission, specifically the UL pilot, or the DL transmission, specifically the DL pilot. In some embodiments, the UE mobility may be determined at the BS based on at least the information associated with the UL transmission and using Doppler estimation. In some other embodiments, the UE mobility may be determined at the UE using the information associated with the DL transmission and using Doppler estimation, and then reported (e.g. the speed) to the BS via uplink control information (UCI).

Next, as shown in block 506, the flow diagram includes determining a total transmission duration based on at least the channel coherence time. In some embodiments, the total transmission duration includes a period of time associated with the transmission of the data frame. In one aspect, the predetermined period of time associated with the transmission of the data frame includes a preconfigured upper limit value. For example, in cases where the UE is relatively stationary, the channel coherence time can be relatively long. In such situations, the total transmission duration is typically defined by the preconfigured upper limit value. In some embodiments, the system may be configured to determine a total transmission time by defining a time period between a timestamp indicating a beginning of the UL transmission and a timestamp indicating a completion of the DL transmission. In other words, the total transmission time may be defined as an amount of time that the data is transmitted between the BS and the UE based on at least the UL transmission, specifically the UL pilot signal. In some embodiments, the UL transmission and/or the DL transmission includes ACK (acknowledgement)/NACK (negative-acknowledgement) signaling indicating a positive or negative perception of data transmission between the BS and the UE. In some other embodiments, the ACK/NACK signaling may be transmitted as part of the DCI and/or the UCI.

FIG. 6 illustrates a combination of (sub) frame structures 400 in a transmission, in accordance with an embodiment of the invention. As shown in FIG. 6, the UL payload information and/or the DL payload information and their corresponding pilots used to estimate the channel are not necessarily allocated within the standard sub-frame. In this regard, the combination of the (sub) frame structures illustrate both a standard frame structure supporting low latency (NR) and a frame structure supporting massive MIMO.

FIG. 7 illustrates a massive MIMO (sub) frame structure 500 with reference of the last slot in a (sub) frame, in accordance with an embodiment of the invention. As discussed herein, the total transmission duration includes a period of time associated with the transmission of the data frame. As shown in FIG. 7, the system may be configured to determine a total transmission time by defining a time period between a timestamp indicating a beginning of the UL transmission and a timestamp indicating a completion of the DL transmission. During this time period, the channel is considered to remain almost constant, such that the system may operate during this time without the need for additional pilot signals. In some embodiments, the BS may be configured to determine the total transmission duration by processing information associated with the UL transmission and/or any other reported information received from the UE.

FIG. 8 illustrates a long massive MIMO frame structure 600 with one or more UL pilots, in accordance with an embodiment of the invention. In some embodiments, the data transmission may require a longer time frame due to reasons including, but not limited to large transport block size and/or repetitions. In such cases, the BS may allocate one or more additional UL pilot slot(s). For example, as shown in FIG. 8, the additional UL pilot slot maybe located with the same offset time as the previous UL pilot T_of.

FIG. 9 illustrates a massive MIMO (sub) frame structure 700 with low latency support, in accordance with an embodiment of the invention. In some embodiments, massive MIMO can also support UL transmission with low latency. In this regard, the BS allocates UL transmission slot(s) after the last DL slot that may be used to transmit the ACK/NACK information to the BS. In one aspect, the DCI may contain the UL pilot allocation (e.g., T_of), DL data allocation, and UL ACK/NACK allocation (i.e., T_ACK).

Each processor described herein generally includes circuitry for implementing audio, visual, and/or logic functions. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory.

Each memory may include any computer-readable medium. For example, memory may include volatile memory, such as volatile random access memory ("RAM") having a cache area for the temporary storage of data. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system.

The various features described with respect to any embodiments described herein are applicable to any of the other embodiments described herein. As used herein, the terms data and information may be used interchangeably. Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more," even though the phrase "one or more" or "at least one" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures, etc.), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory ("ROM"), an erasable programmable read-only memory ("EPROM" or Flash memory), a compact disc read-only memory ("CD-ROM"), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable information processing apparatus in order to produce a particular machine, such that the one or more computer-executable program code portions, which execute via the processor of the computer and/or other programmable information processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable information processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable information processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for determining timing relationships of pilot and data, wherein the system is configured to:
   receive, at a Base Station (BS), an uplink (UL) pilot as part of a UL transmission from a User Equipment (UE) in network communication with the BS via a communication channel;
   determine a channel coherence time, wherein the channel coherence time comprises a period of time during which the communication channel is unchanged;
   determine an offset time, wherein the offset time comprises a period of time between a time stamp associated with the receiving of the UL transmission and a time stamp associated with a DL transmission, the offset time being determined in relation to the channel coherence time; and
   determine a total transmission duration based on at least the channel coherence time.

2. The system of claim 1, wherein the channel coherence time is determined based on at least the UL transmission.

3. The system of claim 1, wherein the total transmission duration comprises a period of time associated with transmission of a data frame, wherein the period of time associated with the transmission of the data frame comprises a preconfigured upper limit value.

4. The system of claim 3, wherein determining the total transmission duration further comprises determining a link quality performance of the communication channel.

5. The system of claim 1, wherein the UL pilot is transmitted by the UE at a first frame associated with a data frame and/or a subsequent UL payload information is transmitted by the UE in a second frame associated with the data frame, wherein the second frame immediately follows the first frame.

6. The system of claim 1, wherein the total transmission duration is determined based on at least the UL pilot.

7. The system of claim 1, wherein the UL transmission and/or DL transmission comprises ACK (acknowledgement)/NACK (negative-acknowledgement) indicating a positive or negative reception of data transmission between the BS and the UE.

8. The system of claim 1, wherein further comprises determining antenna configuration parameter associated with one or more antenna in the BS, wherein the antenna configuration parameter is determined during the offset time.

9. The system of claim 1, wherein determining offset time further comprises determining a minimum duration associated with the offset time and a maximum duration associated with the offset time, wherein the minimum duration comprises a time period for processing the UL transmission to determine antenna configuration parameters, wherein the maximum duration comprises a time period equivalent to the channel coherence time.

10. The system of claim 1, wherein determining offset time further comprises determining a maximum duration associated with the offset time, wherein the maximum duration comprises a time period associated with a difference between a channel coherence time and a sum of a time period associated with the UL transmission and a time period associated with the DL transmission.

11. The system of claim 1, wherein the offset time is determined by the BS based on at least one or more channel characteristics, wherein the one or more channel characteristics comprises UE mobility and/or link quality performance of the communication channel.

12. The system of claim 11, wherein the UE mobility is determined based on at least the UL transmission and/or the DL transmission.

13. The system of claim 11, wherein the UE mobility is determined at the BS and/or at the UE.

14. The system of claim 1, wherein the offset time is determined by the BS based on at least one or more channel characteristics, wherein the one or more channel characteristics comprises operating frequency.

15. The system of claim 1, wherein the total transmission duration is determined by defining a period of time between a time stamp indicating a beginning of the UL transmission and a time stamp indicating a completion of the DL transmission.

16. The system of claim 1, wherein prior to determining the channel coherence time, the system is further configured to:
   determine Downlink Control Information (DCI) based on at least the UL transmission, wherein the DCI comprises information required to decode data transmission between the BS and the UE;

transmit the DCI to the UE; and initiate downlink (DL) transmission from the BS to the UE, wherein the DL transmission is decoded by the UE based on the DCI, wherein the DL transmission comprises a DL pilot and/or a DL payload.

17. The system of claim 16, wherein the DCI further comprises UL pilot allocation, DL data allocation, and/or UL ACK/NACK allocation.

18. A method for determining timing relationships of pilot and data, the method comprising:

receiving, at a Base Station (BS), an uplink (UL) pilot as part of a UL transmission from a User Equipment (UE) in network communication with the BS via a communication channel;

determining, using a computing device processor, a channel coherence time, wherein the channel coherence time comprises a period of time during which the communication channel is unchanged;

determining an offset time, wherein the offset time comprises a period of time between a time stamp associated with the receiving of the UL transmission and a time stamp associated with a DL transmission, the offset time being determined in relation to the channel coherence time; and determining, using the computing device processor, a total transmission duration based on at least the channel coherence time.

19. A computer program product for determining timing relationships of pilot and data, the computer program product comprising a non-transitory computer-readable medium comprising code causing a first apparatus to:

receive, at a Base Station (BS), an uplink (UL) pilot as part of a UL transmission from a User Equipment (UE) in network communication with the BS via a communication channel;

determine a channel coherence time, wherein the channel coherence time comprises a period of time during which the communication channel is unchanged;

determine an offset time, wherein the offset time comprises a period of time between a time stamp associated with the receiving of the UL transmission and a time stamp associated with a DL transmission, the offset time being determined in relation to the channel coherence time; and determine a total transmission duration based on at least the channel coherence time.

* * * * *